United States Patent [19]
Rauch et al.

[11] Patent Number: 5,971,323
[45] Date of Patent: Oct. 26, 1999

[54] RESISTIVE ELEMENTS FOR HEATING AN AEROFOIL, AND DEVICE FOR HEATING AN AEROFOIL INCORPORATING SUCH ELEMENTS

[75] Inventors: Patrice Rauch, Fuveau; Jean-Cyril Bauchet, Montgeron, both of France

[73] Assignee: Eurocopter, Marigane Cedex, France

[21] Appl. No.: 08/978,046

[22] Filed: Nov. 25, 1997

[30] Foreign Application Priority Data

Nov. 27, 1996 [FR] France .................................. 96 14529

[51] Int. Cl.$^6$ .............................. B64D 15/00; B60L 1/02
[52] U.S. Cl. ...................................... 244/134 D; 219/202
[58] Field of Search ......................... 244/134 D; 219/202

[56] References Cited

U.S. PATENT DOCUMENTS

| 2,556,330 | 6/1951 | La Rue ................................ 244/134 D |
| 2,741,692 | 4/1956 | Luke . |
| 4,386,749 | 6/1983 | Sweet et al. . |
| 4,737,618 | 4/1988 | Barbier et al. . |
| 5,152,480 | 10/1992 | Adams et al. ........................ 244/134 D |
| 5,344,696 | 9/1994 | Hastings et al. ........................ 428/220 |
| 5,475,204 | 12/1995 | Giamati et al. .......................... 219/548 |

FOREIGN PATENT DOCUMENTS

| 204623 | 3/1956 | Australia .......................... 244/134 D |
| 626897 | 9/1961 | Canada .............................. 244/134 D |
| 2 382 371 | 9/1978 | France . |
| 2 719 182 | 10/1995 | France . |
| 2 121 745 | 1/1984 | United Kingdom . |
| 2 291 575 | 1/1996 | United Kingdom . |

*Primary Examiner*—Charles T. Jordan
*Assistant Examiner*—Theresa M. Wesson
*Attorney, Agent, or Firm*—Henderson & Sturm

[57] ABSTRACT

To combat the formation of ice on an aerofoil, several resistive elements each consisting of electrically conducting fibers parallel to the leading edge and through which an electric current is made to flow to dissipate heat by a Joule effect are incorporated into this aerofoil close to its leading edge. In order to obtain a thermal power which can vary along the leading edge, the resistive elements are produced by superposing several layers of conducting fibers, at least one of which layers has a constant width, and at least one other of which has a width which varies continuously along the leading edge, but remains smaller than said constant width.

5 Claims, 3 Drawing Sheets

FIG.4. FIG.5. FIG.6. FIG.7.
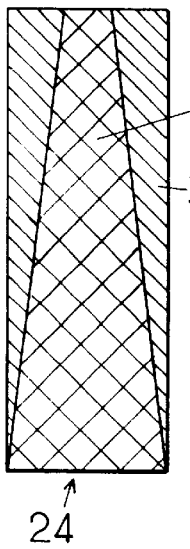
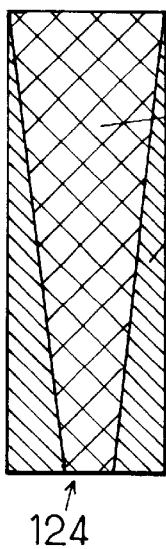
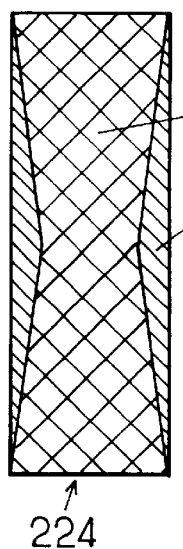
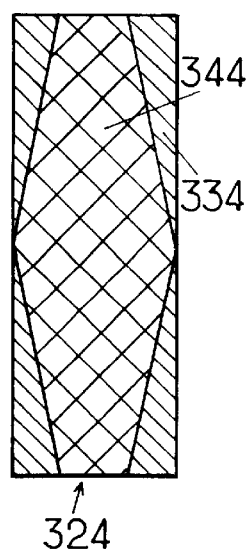
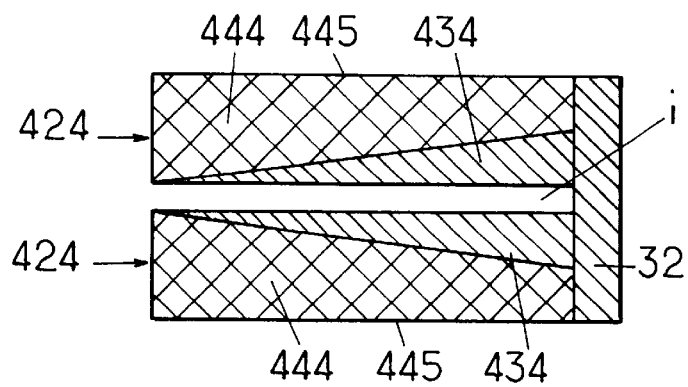
FIG.8.
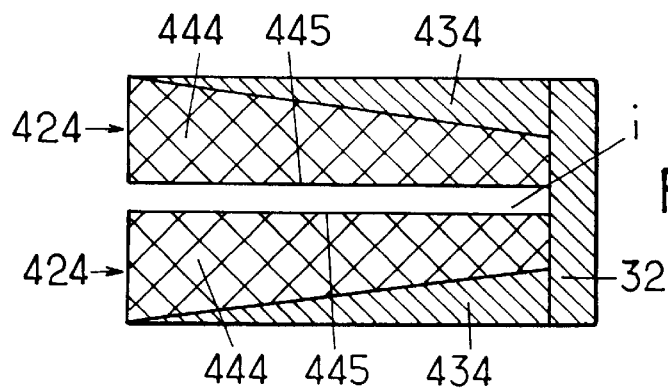
FIG.9.

RESISTIVE ELEMENTS FOR HEATING AN AEROFOIL, AND DEVICE FOR HEATING AN AEROFOIL INCORPORATING SUCH ELEMENTS

TECHNICAL FIELD

The present invention relates to devices for heating aerofoils. The aerofoils concerned are generally those whose aerodynamic shape must not be disturbed by the formation of ice, especially helicopter blades (for the main rotor or the counter-torque rotor), or alternatively airplane wings, etc.

BACKGROUND OF THE INVENTION

The problem of icing on aerofoils is well known in the aeronautics industry. The shape of the aerofoils may be altered on account of the formation of ice that occurs because during flight, the aerofoil encounters droplets of supercooled water contained in the atmosphere.

This problem is often dealt with by equipping the aerofoil with a Joule-effect heating structure. A distinction is made between "deicers", in which the resistive elements that dissipate heat are powered intermittently to remove the ice that regularly forms, and "anti-icing devices", in which the resistive elements are powered continuously to prevent ice from forming. Although the present invention is explained hereafter in its application to anti-icing devices, by way of an illustration, it will be understood that it is also applicable to deicers.

Usually, the heating structure consists of metal resistors. These metal resistors pose problems of mechanical integrity, particularly for aerofoils that are made of composite material, of tolerance to damage (multiple redundancy is needed to ensure that the breakage of one metal resistor does not prevent the entire device from functioning), of uniform heating per unit area, and of corrosion.

In order to limit the occurrence of these problems, it has been proposed that use be made of a composite deicer in which the resistive elements are composed of carbon fibers (see French Patent 2 578 377). These resistive elements form strips of carbon fibers which preferably run along the leading edge of the aerofoil.

The invention finds a particular application in the field of helicopter blades.

A number of complex physical phenomena are involved, often in conflicting ways, in the thermal behavior, the accumulation and the deicing of a blade. To make the explanations clear, these will be limited here to describing the simplest phenomena, and they will be considered independent of one another:

a) there is more kinetic heating caused by the rotation of a blade in the air at its tip than there is at the root of the blade. This means that the power to be provided per unit area to give thermal protection tends to decrease toward the blade tip;

b) the convective heat exchange coefficients are higher at the blade tip because of the higher rotational speed. With all else being equal, furthermore, this phenomenon means that the power to be provided per unit area for thermal protection is higher at the tip;

c) the accumulation volume is greater at the blade tip because the particles of supercooled water have less tendency to be deflected by the aerodynamic flow around the aerofoil when the relative speeds increase. Taken in isolation, this phenomenon requires a higher thermal power per unit area at the blade tip;

d) simulations (codes and testing) of the thermal behavior of an anti-iced blade section show that under certain flight conditions (flying in dry air with the anti-icer running), the temperatures reached within the blade exceed the permissible limits for the resins of which this blade is made. These codes are then used to solve the opposite problem and calculate the thermal power per unit area that is permissible in order not to exceed these "critical" temperatures for the resins. The change obtained in the thermal power per unit area is the opposite to case "a" above because the phenomenon in dry air is governed by convective exchanges, which leads to a reduction in the heating power per unit area which is greater at the blade root than at the tip.

It should be noted that in general, the pilot does not have a sufficiently reliable detector of ice formation available to him. Thus, when he finds himself in conditions that may cause icing (finds himself approaching icing clouds, etc.), he switches on the anti-icing device in anticipation: the air may still be dry though. Under these conditions, there is the risk that the anti-icing device will be too effective and will give rise to excessive blade temperatures. These conditions therefore need to be taken into consideration when designing the anti-icing device.

Taking the various relevant phenomena into account, the aerodynamicists and the thermodynamicists are laying down specifications regarding the change in thermal power per unit area to be provided over the surface of the aerofoil. In order to obtain a variation in thermal power per unit area perpendicular to the direction of the strips, it is possible to envisage thicknesses of carbon that differ from one strip to another. To obtain a variation parallel to a strip, common practice is to interrupt some of the layers of fibers of which the strip is formed at certain positions along the strip, which leads to thicknesses and electrical resistances that differ in successive portions. This approach causes sharp variations in power per unit area and does not readily allow the thermal specifications to be met.

SUMMARY OF THE INVENTION

An object of the present invention is to propose a composite heating structure that allows the thermal power dissipated per unit area to vary gradually parallel to the leading edge.

The invention thus proposes a resistive element for heating an aerofoil, comprising several superposed layers of electrically conducting fibers, the layers and the conducting fibers running parallel to a leading edge of the aerofoil. At least a first of the superposed layers has a constant width, while at least a second of the superposed layers has a width that varies continuously along the leading edge and is smaller than the constant width of the first layer.

A device for heating the aerofoil may thus comprise one or more resistive elements of this type arranged parallel to the leading edge and powered electrically so that they dissipate heat by a Joule effect.

The variable-width layers of carbon mean that the resistance of the resistive element varies progressively along the leading edge, and this progressive variation can easily be matched to the required variation in thermal power per unit area. The constant-width layers make it possible to keep a constant gap between adjacent elements, and this avoids the occurrence of cold spots liable to collect ice.

BRIEF DESCRIPTION OF THE DRAWINGS

Other specific features and advantages of the present invention will become clear from the description hereafter of non-limiting embodiments with reference to the appended drawings, in which:

FIGS. 4 to 9 are diagrammatic views from above of resistive elements according to the invention.

DETAILED DESCRIPTION OF THE PREFERRED EMBODIMENTS

Figure 1:
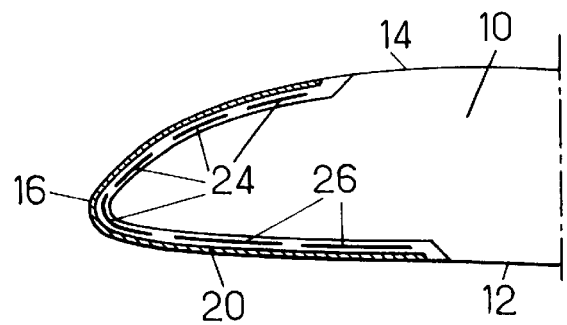
FIG. 1 is a diagrammatic sectional view of an aerofoil equipped with a device according to the invention.

FIG. 1 shows diagrammatically in cross section an aerofoil 10 which consists of a helicopter blade, for example a counter-torque rotor blade, and is equipped with an anti-icing device according to the invention. The numerical references 12, 14 and 16 denote the pressure face, the suction face and the leading edge of the blade 10, respectively.

The blade is made of composite material, and the vicinity of its leading edge 16 is covered with metal armoring 20 to protect it from impact. Immediately behind the armoring 20 there is a heating mat made of composite material constituting the anti-icing device. This heating mat contains a number of resistive elements 24, 26 consisting of strips of conducting (carbon) fibers running longitudinally along the span of the blade, that is to say parallel to the leading edge 16.

Figure 2:
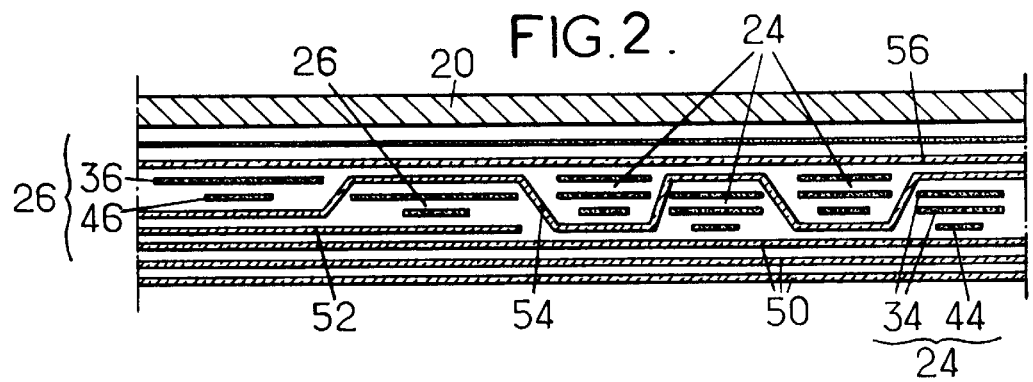
FIG. 2 shows a cross section through a heating mat of a device according to the invention, depicted laid out flat, the section being on the plane II—II marked on FIG. 3.
Figure 3:
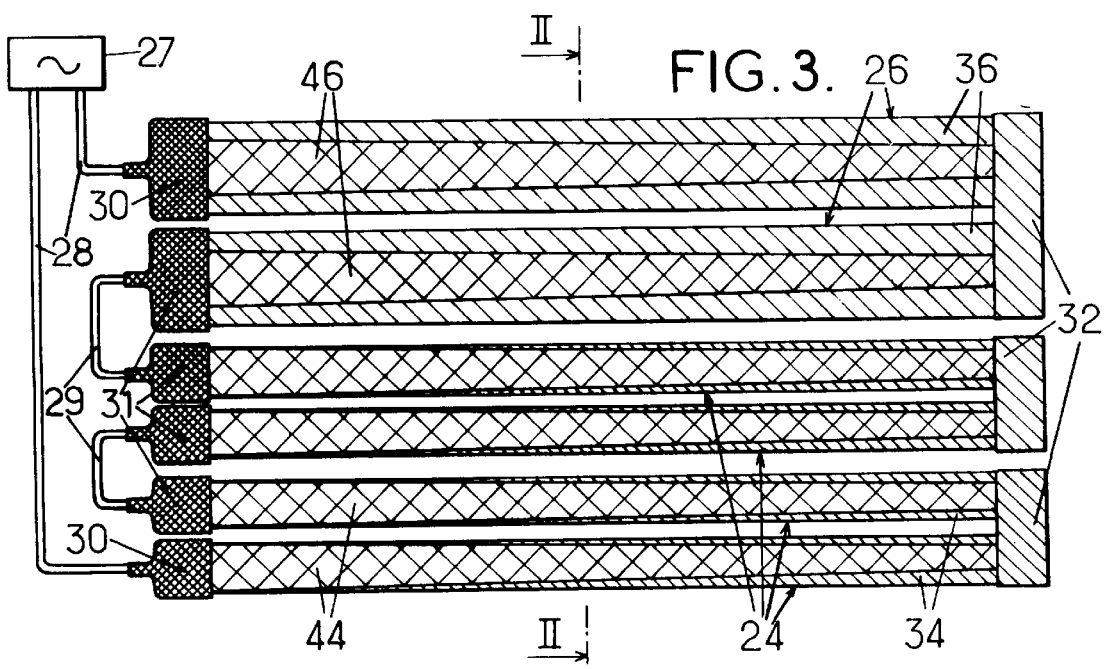
FIG. 3 is a plan view of the resistive elements of the heating mat of FIG. 2, depicted laid out flat.

FIGS. 2 and 3 show an example of a heating mat that can be used in a device according to the invention. The carbon resistive elements 24, 26 run along most of the span of the blade. At its proximal end (toward the rotor hub), each resistive element 24, 26 is connected to a power supply lead 28, 29 by means of a sheath 30, 31 in the form of a metal mesh (cf. FR-A-2 578 377). The sheath 30, 31 surrounds the proximal end of the carbon resistive element over a length of about 50 mm for example, and it entraps the lead 28, 29 to ensure electrical contact. At their distal ends, the resistive elements 24, 26 are in electrical contact so that they can be combined in pairs. Each pair has a strip 24, 26 for current to flow toward the tip of the blade and a strip 24, 26 for returning the current toward the root of the blade. For each pair, one or more layers of carbon conducting fibers 32 run transversely to the leading edge and are in contact with the distal ends of the resistive elements 24, 26 of the pair.

In the particular instance shown in FIGS. 2 and 3, the pairs of resistive elements are mounted in series by means of the sheaths 31 and the leads 29 and are connected by means of the sheaths 30 and of the leads 28 to an electric power supply 27 of the helicopter. The strips 24 situated on the leading edge 16 and the suction face 14 of the blade are not as wide as the strips 26 situated on the pressure face 12.

Figure 3A:
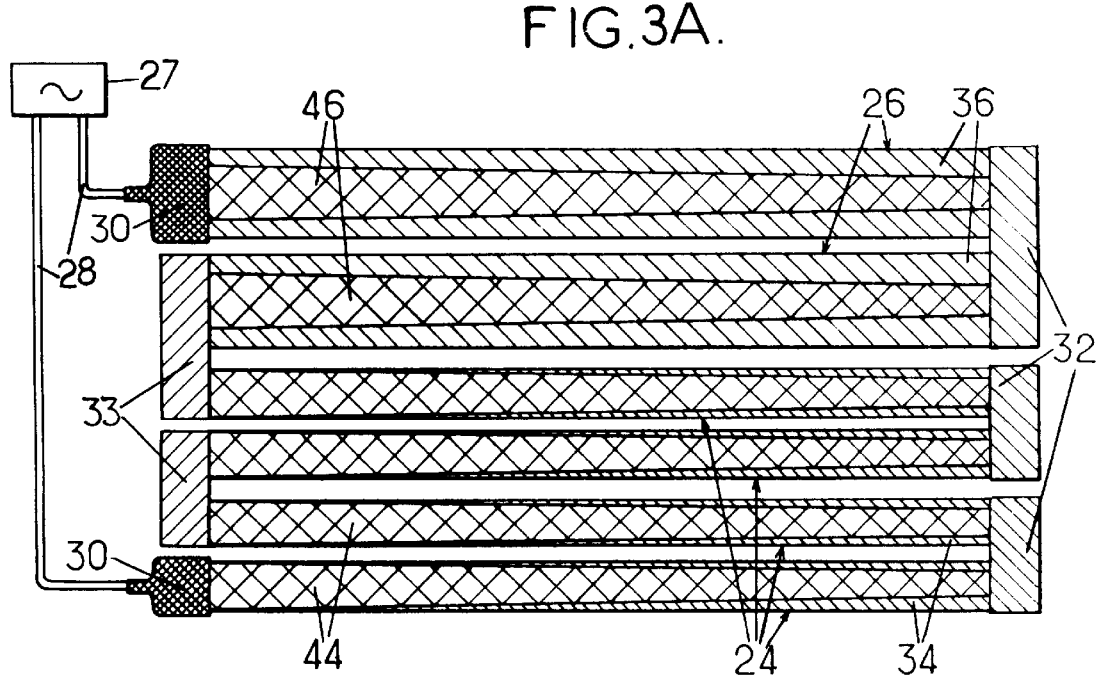
FIG. 3A shows an alternative form of the mat of FIG. 3.

In the alternative form of FIG. 3A, the pairs of resistive elements are mounted in series not by connecting systems of the sheath 31/lead 29 type, but by layers of carbon fibers 33 of the same type as the layers 32 situated at the distal end. Of course it would also be possible to provide the electrical contacts at the distal end using connector systems of the sheath/lead type. Another possibility would be to connect the resistive elements or the pairs of resistive elements in parallel rather than in series.

Each carbon strip 24, 26 constituting a resistive element is composed of one or more layers 34, 36 of carbon fibers with a constant width along the span of the blade, and of one or more layers 44, 46 of carbon fibers with a width that varies continuously along the span of the blade. In FIG. 3 or 3A, the constant-width carbon layers are depicted by single hatching, and the variable-width carbon layers are depicted by cross-hatching. The same convention will be used in FIGS. 4 et seq. In each strip 24, 26, the layers of carbon are superposed, and the variable-width layers 44, 46 are everywhere narrower than the constant width of the layers 34, 36 so that they do not protrude laterally beyond the latter layers. This ensures that there is a constant gap between the strips along the span of the blade, as shown in FIG. 3 or 3A.

In the example of FIGS. 2 and 3 or 3A, the strips 24 on the suction face side each comprise two layers 34 of constant width and one layer 44 of variable width, while the strips 26 on the pressure face side comprise just two layers, one 36 of constant width and the other 46 of variable width.

The heating mat is, for example, produced flat using a method like the one described in French Patent 2 578 377. In a first stage, a lower skin of the mat, which skin consists, for example, of three layers 50 of fiberglass fabric with different orientations, is placed over a support, together with an additional layer 52 of fiber glass fabric that covers just the pressure face part of the mat to compensate for the lesser thickness of the carbon strips in this part (see FIG. 2). Half of the carbon strips 24, 26 (every second strip along the width of the mat) is then placed on this lower skin, as are their metal connecting sheaths 30 and/or 31. The constant-width layers 34, 36 of these strips may be dispensed from reels of carbon fibers. In the case of the variable-width layers 44, 46, first of all the lateral edges of these layers are cut to obtain the desired shape. This cutting may be achieved by stamping, the fibers of the layer being supported by a plastic sheet during this operation. Once half of the carbon strips have been put in place, one or more layers of fiberglass fabric 54 which serve to insulate the strips from each other and to ensure that they are correctly positioned are positioned over these strips (except at their distal ends). The remaining half of the carbon strips 24, 26 are then put in place using the same process as was used earlier. At the ends of the strips, the transverse layers 32 and/or 33 may be put in place before and/or after the layers constituting the longitudinal strips. The assembly is finally covered with a top skin consisting, for example, of a layer 56 of fiberglass fabric. A compacting roll is then passed over the mat thus assembled in order to give it a certain amount of mechanical integrity (the fiberglass fabrics 50, 52, 54, 56 are pre-impregnated with resin), and to ensure good electrical contact between the resistive elements 24, 26 and their respective metal sheaths 30, 31 and between the resistive elements 24, 26 and the transverse layers 32, 33. In order to shape the mat thus pre-compacted, there are two options available. The first option consists in shaping the mat over a former which mimics the shape near the leading edge, and in polymerizing the resin on this former, possibly with the armoring 20. The component thus obtained can then be bonded to the blade made separately. The second option consists in polymerizing the resin directly during molding of the blade, in the same mold.

FIGS. 4 to 7 show various possible configurations of the strips of carbon fibers for giving a thermal power per unit area that changes from the proximal end of the strip 24, 124, 224, 324 (bottom of FIGS. 4 to 7) toward the distal end of the strip 24, 124, 224, 324 (top of FIGS. 4 to 7). In each of these four configurations, the variable-width carbon layers 44, 144, 244, 344 have a shape that is symmetric with respect to a plane containing the median axis of the constant-width layers 34, 134, 234, 334. This makes it possible to obtain a dissipation of heat that is uniform between the various inter-strip gaps. The example of FIG. 4 corresponds to the case already depicted in FIGS. 3 and 3A, where the width of the layers 44 decreases from the blade root toward the tip, which corresponds to an increase in thermal power per unit area. A configuration of this kind will be adopted in cases where the convective exchanges are the dominant phenomenon in the thermal behavior of the blade.

The configuration of FIG. 5 corresponds to the opposite case in which the kinetic heating tends to dominate the convective exchange phenomena. In this case, the width of the layers 144 is increased toward the distal end of the blade.

The configurations in FIGS. 6 and 7 correspond to intermediate cases, for which it is desirable for the width of the layers 244, 344 to have an extremum between the two ends of the strip 224, 324. This extremum is a minimum in the case of FIG. 6, and a maximum in the case of FIG. 7.

FIGS. 8 and 9 can be distinguished from FIGS. 4 to 7 in the asymmetric shape of the variable-width carbon layers, which makes it possible to encourage heating in some of the inter-strip gaps. In both cases, the variable-width layers 444 of each resistive element 424 have one lateral edge 445 parallel to the leading edge and aligned with a lateral edge of the constant-width layers 434 of this element. The inter-strip gap adjacent to this kind of lateral edge 445 of the strip 424 will tend to receive more thermal power per unit area by conduction from this strip 424 than a gap adjacent to the opposite lateral edge. Thus the inter-strip gap i will receive less thermal power per unit area in the case of FIG. 8 than in the case of FIG. 9.

We claim:

1. A resistive element for heating an aerofoil, comprising several superposed layers of electrically conducting fibers, the layers and the conducting fibers running parallel to a leading edge of the aerofoil, wherein at least a first of the superposed layers has a constant width, while at least a second of the superposed layers has a width that varies continuously along the leading edge and is smaller than the constant width of the first layer.

2. The resistive element as claimed in claim 1, wherein the width of the second of the superposed layers has an extremum between the ends of the element.

3. The resistive element as claimed in claim 1 or 2, wherein the second of the superposed layers has a shape that is symmetric with respect to a plane containing the median axis of the first layer.

4. The resistive element as claimed in claim 1 or 2, wherein the second of the superposed layers has one lateral edge parallel to the leading edge and aligned with a lateral edge of the first layer.

5. A device for heating an aerofoil comprising, incorporated into the aerofoil near to a leading edge of the aerofoil, several resistive elements each consisting of electrically conducting fibers, means being provided for making an electric current flow through the resistive elements, wherein at least one of the resistive elements is a resistive element as claimed in claim 1.

* * * * *